United States Patent [19]

Okuda et al.

[11] Patent Number: 4,959,959
[45] Date of Patent: Oct. 2, 1990

[54] DISTRIBUTION RING IN HYDRAULICALLY OPERATED CONTINUOUSLY VARIABLE TRANSMISSION

[75] Inventors: Akihito Okuda; Yoshihiro Katagiri, both of Saitama; Hiromi Aoki, Tokyo, all of Japan

[73] Assignee: Honda Giken Kogyo Kabushiki Kaisha, Tokyo, Japan

[21] Appl. No.: 268,693

[22] Filed: Nov. 8, 1988

[30] Foreign Application Priority Data

Nov. 9, 1987 [JP] Japan .................. 62-282579

[51] Int. Cl.⁵ .......................... F16D 39/00
[52] U.S. Cl. .......................... 60/489; 60/487; 91/484
[58] Field of Search ............... 91/484, 485, 499, 506; 60/487, 489

[56] References Cited

U.S. PATENT DOCUMENTS

| | | |
|---|---|---|
| 2,777,286 | 1/1957 | Badalini . |
| 3,213,619 | 10/1965 | Creighton et al. . |
| 3,364,679 | 1/1968 | Osojnak . |
| 3,364,680 | 1/1968 | Osojnak . |
| 4,444,093 | 4/1984 | Koga et al. . |
| 4,700,613 | 10/1987 | Tiljander .................. 91/485 |
| 4,856,279 | 8/1989 | Kawahara et al. . |

FOREIGN PATENT DOCUMENTS

| | | |
|---|---|---|
| 0273632 | 7/1988 | European Pat. Off. . |
| 824295 | 12/1951 | Fed. Rep. of Germany . |
| 968539 | 2/1958 | Fed. Rep. of Germany . |
| 2052878 | 5/1972 | Fed. Rep. of Germany . |
| 327159 | 8/1953 | Japan . |
| 41-3208 | 3/1966 | Japan . |

*Primary Examiner*—Edward K. Look
*Attorney, Agent, or Firm*—Lyon & Lyon

[57] ABSTRACT

A hydraulically operated continuously variable transmission comprising a hydraulic motor of the variable displacement type having a motor cylinder coupled to an output shaft and including motor plungers slidably disposed respectively in a number of cylinder holes defined in an annular pattern surrounding the axis of rotation of the motor cylinder, and a hydraulic pump coupled to an input shaft. The hydraulic motor and hydraulic pump are interconnected by a closed hydraulic circuit in which the flow of working oil is controlled by a distribution ring which is relatively rotatably and slidably held against an end surface of the motor cylinder for successively switching the introduction of working oil into the cylinder bores and the discharge of working oil from the cylinder bores in response to rotation of the motor cylinder. The distribution ring has an asymmetrical hydraulic pressure bearing area in order to minimize forces tending to tilt the distribution ring relative to the motor cylinder end surface.

9 Claims, 6 Drawing Sheets fig. 1.

DISTRIBUTION RING IN HYDRAULICALLY OPERATED CONTINUOUSLY VARIABLE TRANSMISSION

The present invention relates to a continuously variable transmission and, in particular, to a distribution ring for successively distributing oil discharged from a hydraulic pump to a hydraulic motor of the variable displacement type in a hydraulicly operated continuously variable transmission in which the hydraulic pump and the hydraulic motor are interconnected by a closed hydraulic circuit.

There have been proposed various hydraulically operated continuously variable transmissions for use in automobiles of the type that include an axial-plunger pump having a pump cylinder coupled to an input shaft and pump plungers slidably disposed respectively in a number of cylinder holes defined in the pump cylinder in an annular pattern around the center of rotation of the pump cylinder, a swash-plate axial-plunger hydraulic motor having a motor cylinder coupled to an output shaft and motor plungers slidably disposed respectively in a number of cylinder holes defined in the motor cylinder in an annular pattern around the center of rotation of the motor cylinder, the pump and the motor being interconnected by a closed hydraulic circuit, such as generally shown in U.S. Pat. No. 2,777,286. Power is transmitted through relative rotation between the motor cylinder and the pump cylinder.

As disclosed in Japanese Patent Publications Nos. 32-7159 and 41-3208, for example, communication ports arranged at substantially equal angular intervals in communication with the respective cylinder holes in the motor cylinder are defined in the motor cylinder and open at an axial end face thereof in an annular pattern around the axis of rotation of the motor cylinder. An annular distribution ring is disposed eccentrically with respect to the axis of rotation of the motor cylinder and held in slidable contact with the end face of the motor cylinder. Oil discharged from the pump is introduced into the distribution ring, whereas oil discharged from the motor cylinder is introduced around the distribution ring.

The outlet and inlet ports of the pump are brought into successive communication with the communication ports in the motor cylinder in response to relative rotation between the distribution ring and the motor cylinder for reciprocally moving the annularly arranged motor plungers.

Another known distribution ring has a suction port for introducing oil discharged from the pump into those cylinder holes which are in the expansion stroke and a discharge port for discharging oil from those cylinder holes which are in the contraction stroke, the suction and discharge ports being of an arcuate shape along the annular pattern of the communication ports. In this arrangement, the angularly arranged communication ports are successively brought into communication with the suction and discharge ports of the distribution ring in response to rotation of the motor cylinder for repeatedly reciprocally moving the motor plungers while drawing in and discharging working oil.

However, in such arrangements, the distribution ring is subjected to forces tending to press the distribution ring against the end face of the motor cylinder under a relatively high oil pressure discharged from the pump and a relatively low oil pressure discharged from the motor, and also to forces tending to separate the distribution ring away from the motor cylinder end face under the inner pressure in the cylinder holes. The center of the pressing forces is aligned with the central axis of the distribution ring if the pressure bearing surface of the distribution ring is uniform along its circumference. Upon acceleration, for example, since the pressure in those cylinder holes in the contraction stroke is higher than the pressure in those cylinder holes in the expansion stroke, the center of the separating forces is shifted toward the group of communication ports in the expansion stroke. It also has been found that when the motor cylinder rotates at high speed, the pressure distribution between the motor cylinder and the distribution ring tends to extend in the direction of rotation, shifting the center of the separating forces toward the bottom dead center (i.e., the point where the expansion stroke ends). An unbalancing moment acting on the distribution ring due to the deviation between the center of the pressing forces and the center of the separating forces makes the gap irregular between the end face of the motor cylinder and the surface of the distribution ring which abuts the motor cylinder end face. This results in an increase in oil leakage from the gap, causing a reduction in the volumetric efficiency of the hydraulic motor. If the pressing forces were increased in an attempt to obviate the above shortcomings, then the pressure on the abutting surfaces would be increased and various problems such as of friction, wear, seizure, etc., would be developed.

In view of the drawbacks of the prior art, it is a major object of the present invention to provide an improved distribution ring in a hydraulically operated continuously variable transmission, the distribution ring being arranged to bring the center of pressing forces acting between a motor cylinder and a distribution ring into alignment with the center of separating forces acting therebetween.

According to the present invention, the aforesaid object can be achieved by a distribution ring in a hydraulically operated continuously variable transmission comprising a hydraulic motor of the variable-displacement type having a motor cylinder coupled to an output shaft and including motor plungers slidably disposed respectively in a number of cylinder holes defined in an annular pattern surrounding the center of rotation of the motor cylinder, and a hydraulic pump coupled to an input shaft, with the hydraulic motor and hydraulic pump being interconnected by a closed hydraulic circuit, wherein the distribution ring is relatively rotatably and slidably held against an end surface of the motor cylinder for successively switching the introduction of working oil into the cylinder bores and the discharge of working oil from the cylinder bores in response to rotation of the motor cylinder and has an asymmetrical pressure-bearing area in order to minimize forces in a tilting direction.

With the above arrangement, the end face of the motor cylinder and the distribution ring are held against each other under uniform surface pressure, and the forces tending to press the motor cylinder and the distribution ring against each other are minimized while avoiding oil leakage from between the motor cylinder and the distribution ring.

A preferred embodiment of the present invention will hereinafter be described in detail with reference to the accompanying drawings, wherein.

Figure 1:
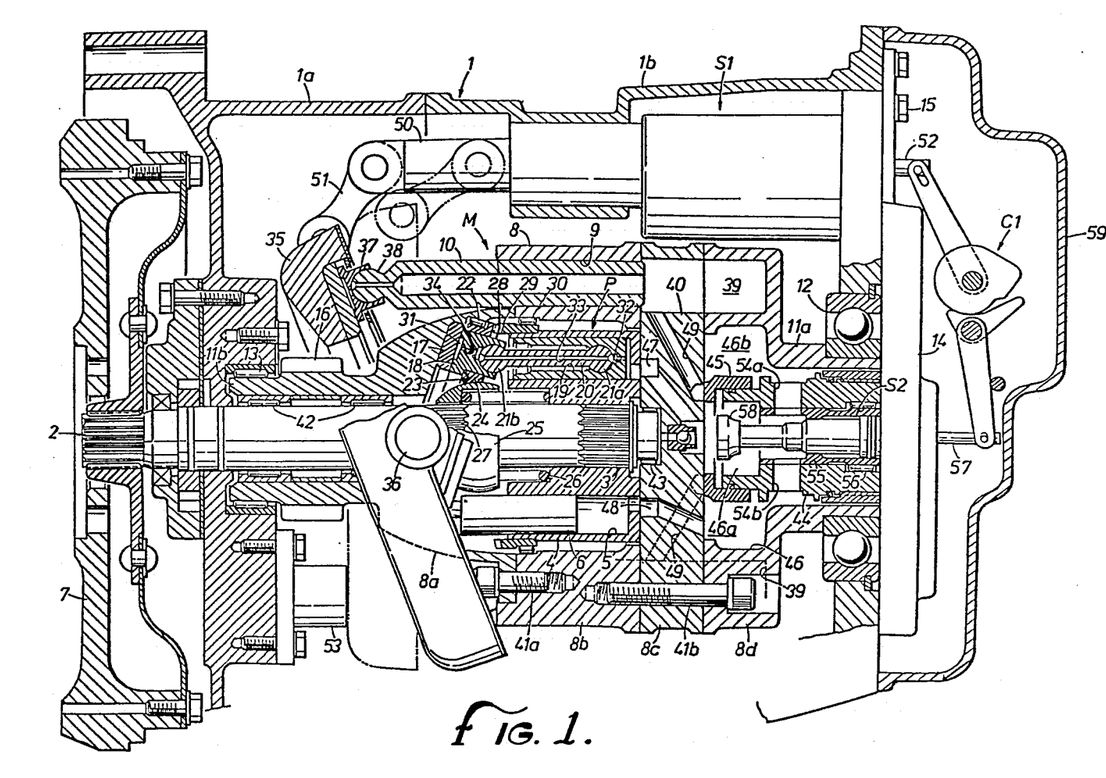
FIG. 1 is a longitudinal cross-sectional view of a hydraulically operated continuously variable transmission according to the present invention.

Referring more particularly to FIG. 1, the hydraulically operated continuously variable transmission for use in a motor vehicle comprises a hydraulic pump P and a hydraulic motor M housed in a transmission case 1 composed of a pair of longitudinally separate case members 1a, 1b.

The hydraulic pump P has a pump cylinder 4 splined to an end 3 of an input shaft 2, a plurality of cylinder holes or bores 5 defined in the pump cylinder 4 in a circular pattern around and concentric with the input shaft 2 and extending parallel to the input shaft 2, and a plurality of pump plungers 6 slidably fitted in the respective cylinder holes 5. The hydraulic pump P can be driven by the power of an engine (not shown) which is transmitted through a flywheel 7 coupled to the opposite end of the input shaft 2.

The hydraulic motor M has a motor cylinder 8 disposed in surrounding relation to the pump cylinder 4, a plurality of cylinder holes or bores 9 defined in the motor cylinder 8 in a circular pattern around and concentric with the input shaft 2 and extending parallel to the input shaft 2, and a plurality of motor plungers 10 slidably fitted in the respective cylinder holes 9. The hydraulic motor M is rotatable relatively to the pump cylinder 4 in concentric relation thereto.

The motor cylinder 8 has axially opposite ends on which a pair of support shafts 11a, 11b are disposed, respectively. The support shaft 11a is rotatably supported on the axial end wall of the case member 1b by means of a ball bearing 12, and the support shaft 11b is rotatably supported on the axial end wall of the case member 1a by means of a needle bearing 13. A holder plate 14 is fixed by bolts 15 to the axial end wall of the base member 1b. The ball bearing 12 and the support shaft 11a are thus fixedly mounted on the base member 1b against axial movement. The other support shaft 11b has an integral spur gear 16 for transmitting output power of the hydraulic motor M through a differential gear mechanism (not shown) to an outside member.

A pump swash plate 17 inclined at an angle to the pump plungers 6 is fixedly disposed radially inwardly of the motor cylinder 8. An annular pump shoe 18 is rotatably and slidably supported on an inclined surface of the pump swash plate 17.

Each of the pump plungers 6 has a bottomed hole 19 opening toward the pump swash plate 17. A connecting rod 20 inserted in the bottomed hole 19 is pivotally movable with respect to the pump plunger 6 by means of a ball joint 21a on the inner end of the connecting rod 20. The connecting rod 20 projects out of the corresponding pump plunger 6 from the bottomed hole 19, and is pivotally movable with respect to the pump shoe 18 by means of a ball joint 21b on the outer projecting end of the connecting rod 20.

The annular pump shoe 18 has its outer peripheral surface supported in the motor cylinder 8 by a needle bearing 22. The annular pump shoe 18 has an annular step 23 defined in its inner peripheral surface facing the pump plungers 6. A presser ring 24 riding in the annular step 23 presses the pump shoe 18 toward the pump swash plate 17 under the resiliency of a compression coil spring 26 disposed under compression around the input shaft 2 and acting on a spring holder 25 held against the presser ring 24.

The spring holder 25 is slidably fitted over splines 27 on the input shaft 2, and has a partly spherical surface contacting a complementary partly spherical surface of the presser ring 24. Therefore, the spring holder 25 is neatly held against the presser ring 24 for transmitting the resilient force from the spring 26 to the presser ring 24 irrespective of how the spring holder 25 and the presser ring 24 are relatively positioned.

Thus, the pump shoe 18 can be slidingly rotated in a fixed position on the pump swash plate 17 at all times.

The pump shoe 18 has a crown gear 28 on the end face thereof facing the pump cylinder 4, with the crown gear 28 extending around the outer periphery of the pump shoe 18. A bevel gear 29, which has the same number of teeth as the crown gear 28, is fixed to the outer periphery of the pump cylinder 4, and held in mesh with the crown gear 28. When the pump cylinder 4 is driven to rotate by the input shaft 2, the pump shoe 18 is rotated in synchronism with the pump cylinder 4 through the meshing gears 28, 29. During rotation of the pump shoe 18, those pump plungers 4 which run along an ascending side of the inclined surface of the pump swash plate 17 are moved in a discharge stroke by the pump swash plate 17, the pump shoe 18, and the connecting rods 20, and those pump plungers 6 which travel along a descending side of the inclined surface of the pump swash plate 17 are moved in a suction stroke.

A needle bearing 30 is disposed between the outer peripheral surface of the bevel gear 29 and the inner peripheral surface of the motor cylinder 8. Therefore, concentric relative rotation of the pump cylinder 4 and the motor cylinder 8 is performed with increased accuracy.

The pump shoe 18 has hydraulic pockets 31 defined in its surface held against the pump swash plate 17 and positioned in alignment with the respective connecting rods 20. The hydraulic pockets 31 communicate with the respective oil chambers in the pump cylinder 4 through oil holes 32 defined in the pump plungers 6, oil holes 33 defined in the connecting rods 20, and oil holes 34 defined in the pump shoe 18. While the pump cylinder 4 is in operation, oil under pressure in the pump cylinder 4 is supplied to the hydraulic pockets 31 to apply a hydraulic pressure to the pump shoe 18 in a direction to bear the thrust force imposed by the pump plungers 6 on the pump shoe 18. Therefore, the oil supplied to the hydraulic pockets 31 serves to reduce the pressure under which the pump shoe 18 contacts the pump swash plate 17, and also to lubricate the mutually sliding surfaces of the pump shoe 18 and the pump swash plate 17.

A motor swash plate 35 is tiltably supported in the transmission case 1 by means of a pair of trunnions 36 projecting from opposite sides of the motor swash plate 35, which is held in confronting relation to the motor plungers 10. The motor swash plate 35 has an inclined surface on which there is slidably disposed a motor shoe 37 that is pivotally coupled to ball joints 38 on the outer ends of the motor plungers 10.

Each of the motor plungers 10 reciprocally moves in expansion and compression strokes while rotating the motor cylinder 8. The stroke of the motor plungers 10 can continuously be adjusted from zero to a maximum level by varying the angle of inclination of the motor swash plate 35 from a vertical position (shown by the two-dot-dash lines) in which the motor swash plate 35 lines perpendicularly to the motor plungers 10 to a most inclined position (shown by the solid lines).

The motor cylinder 8 comprises axially separate first through fourth members, or segments 8a through 8d. The first member 8a includes the support shaft 11b and accommodates the pump swash plate 17. The second member 8b has guide hole portions of the cylinder holes 9 in which the motor plungers 10 are slidably mounted and guided, respectively. The third and fourth members 8c, 8d have oil chambers 39 extending from the guide hole portions of the cylinder holes 9, with the oil chambers 39 being slightly larger in diameter than the guide hole portions of the cylinder holes 9. The third member 8c serves as a distribution member 40 having oil passages leading to the cylinder holes 5, 9, and the fourth member 8d includes the support shaft 11a.

The first through fourth members 8a, 8b, 8c and 8d are relatively positioned by knock pins, for example, inserted in their mating end faces, and are firmly coupled together by means of a plurality of bolts 41a, 41b.

The input shaft 2 has an outer end portion rotatably supported centrally in the support shaft 11b of the motor cylinder 8 by a needle bearings 42, and an inner end portion rotatably supported centrally in the distribution member 40 by a needle bearing 43.

The spring 26 is disposed under compression between the pump cylinder 4 and the spring holder 25 for pressing the pump cylinder 4 against the distribution member 40 to prevent oil from leaking from between the sliding surfaces of the pump cylinder 4 and the distribution member 40. The resilient force of the spring 26 is also effective in supporting the spring holder 25, the presser ring 24, the pump shoe 18, and the pump swash plate 17 firmly in the motor cylinder 8, as described above.

The support shaft 11a is of a hollow structure in which a fixed shaft 44 is centrally inserted. A distribution ring 45 is fitted over the inner end of the fixed shaft 44 in a fluid-tight manner with an O-ring therebetween. The distribution ring 45 has an axial end face held in sliding contact with the distribution member 40. The fourth member 8d of the motor cylinder 8 has an interior hollow space 46 which is divided by the distribution ring 45 into an inner oil chamber 46a and an outer oil chamber 46b.

The distribution member 40 has an outlet port 47 and an inlet port 48. The outlet port 47 provides fluid communication between the cylinder holes 5 that receive the pump plungers 6 operating in the discharge stroke and the inner oil chamber 46a. The inlet port 48 provides fluid communication between the cylinder holes 5 that receive the pump plungers 6 operating in the suction stroke and the outer oil chamber 46b. The distribution member 40 also has a number of communication ports 49 defined therein and through which the cylinder holes 9 of the motor cylinder 8 communicate with the interior space 46 in the fourth member 8d.

The communication ports 49 open into the interior space 46 at equally spaced locations on a circle around the axis of rotation of the hydraulic motor M. In response to rotation of the motor cylinder 8, the communication ports 49 are caused by the distribution ring 45 slidingly held against the distribution member 40 to successively communicate with the inner and outer oil chambers 46a, 46b.

Therefore, a closed hydraulic circuit is formed between the hydraulic pump P and the hydraulic motor M through the distribution member 40 and the distribution ring 45. When the pump cylinder 4 is driven by the input shaft 2, high-pressure working oil discharged by the pump plungers 6 in the discharge stroke flows from the outlet port 47 through the inner oil chamber 46a and the communication ports 49 communicating with the inner oil chamber 46a into the cylinder holes 9 receiving the motor plungers 10 which are in the expansion stroke, thereby imposing a thrust on these motor plungers 10.

Working oil discharged by the motor plungers 10 operating in the contraction stroke flows through the communication ports 49 communicating with the outer oil chamber 46b and the inlet port 48 into the cylinder holes 5 receiving the pump plungers 6 in the suction stroke. Upon such circulation of the working oil, the motor cylinder 8 is driven by the sum of the reactive torque applied by the pump plungers 6 in the discharge stroke to the motor cylinder 8 through the pump swash plate 17 and the reactive torque received by the motor plungers 10 in the expansion stroke from the motor swash plate 35.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}}$$

$$= 1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M from zero to a certain value.

Since the displacement of the hydraulic motor M is determined by the stroke of the motor plungers 10, the transmission ratio can continuously be adjusted from 1 to a certain value by tilting the motor swash plate 35 from the vertical position to a certain inclined position.

A hydraulic ratio-changing servomotor S1 for tilting the motor swash plate 35 is disposed in an upper portion of the transmission case 1. The ratio-changing servomotor S1 has a piston rod 50 having an end projecting into the transmission case 1. The projecting end of the piston rod 50 is coupled to the motor swash plate 35 through a connector 51 and pivot pins. The servomotor S1 has a pilot valve 52, and the outer end of the pilot valve 52 projecting through the holder plate 14 is coupled to a cam mechanism C1. The motor swash plate 35 is remotely controlled by a control device (not shown) through the servomotor S1 and the cam mechanism C1.

The ratio-changing servomotor S1 is of the known type in which a piston therein is reciprocally operated in amplified movement by following the movement of the pilot valve 52 which is given by the control device. In response to operation of the servomotor S1, the motor swash plate 35 can continuously be angularly shifted or adjusted from the most inclined position indicated by the solid lines in FIG. 1 where the transmission ratio is maximum to the least inclined position indicated by the imaginary (two-dot-and-dash) lines where the transmission ratio is minimum.

A stopper 53 is interposed between the motor swash plate 35 and the end wall of the case member 1a for limiting the mechanical least-inclined position of the motor swash plate 35.

The fixed shaft 44 is of a hollow construction having a peripheral wall with radial connecting ports 54a, 54b through which the inner and outer oil chambers 46a, 46b communicate with each other. A cylindrical clutch valve 55 is fitted in the interior space of the fixed shaft 44 for selectively opening and closing the ports 54a, 54b. The clutch valve 55 is rotatably supported relatively to the fixed shaft 44 by a needle bearing 56. The clutch valve 55 serves as a clutch for selectively connecting and disconnecting the hydraulic pump P and the hydraulic motor M. The clutch valve 55 is operatively coupled to a clutch control unit (not shown). When the ports 54a, 54b are fully opened, the clutch is in an "OFF" position. When the ports 54a, 54b are partly opened, the clutch is in a "partly ON" position. When the ports 54a, 54b are fully closed, the clutch is in an "ON" position. With the clutch OFF as shown, working oil discharged from the outlet port 47 into the inner oil chamber 46a flows through the ports 54a, 54b and the outer oil chamber 46b directly into the inlet port 48, making the hydraulic motor M inoperative. When the clutch is ON, the above oil flow is shut off, and working oil is circulated from the hydraulic pump P and the hydraulic motor M, allowing hydraulic power to be transmitted from the hydraulic pump P to the hydraulic motor M.

A servomotor S2 for selectively making and breaking the hydraulic circuit is disposed centrally in the hollow clutch valve 55. The servomotor S2 is operatively coupled to the ratio-changing servomotor S1 though the cam mechanism C1. When a pilot valve 57 of the servomotor S2 which projects out from the holder plate 14 is pushed, a shoe 58 on the distal end of the servomotor 32 closes the open end of the outlet port 47 in the distribution member 40 for thereby cutting off the flow of working oil from the outlet port 47 into the inner oil chamber 46a. With the oil flow thus cut off, the pump plungers 6 are hydraulically locked and the hydraulic pump P and the hydraulic motor M are directly connected to each other, so that the motor cylinder 8 can mechanically be driven by the pump cylinder 4 through the pump plungers 6 and the pump swash plate 17. The hydraulic pump P and the hydraulic motor M are directly interconnected in this manner when the motor swash plate 35 is vertically positioned for the minimum transmission ratio. In this transmission position, the efficiency of transmission of power from the input shaft to the output shaft is increased, and the thrust applied by the motor plungers 10 to the motor swash plate 35 is reduced, thus lessening the stresses on the bearings and other members.

The cam mechanism C1, the holder plate 14, and other members are covered with an end cover 59 attached to the righthand side end of the transmission case 1.

Figure 2:
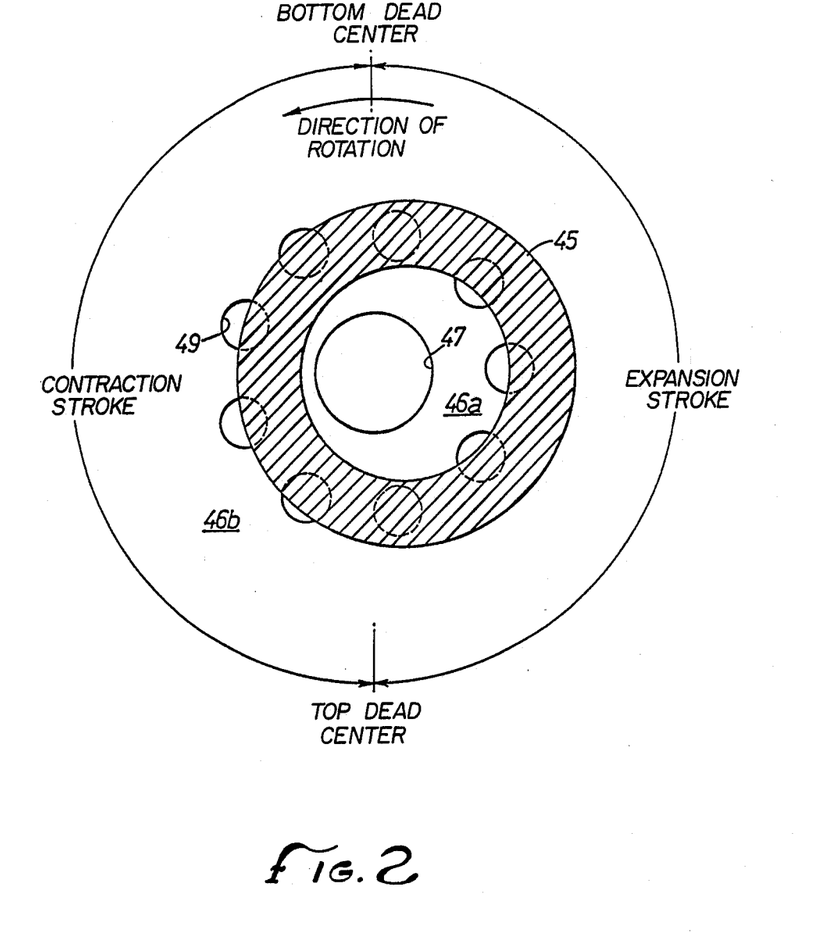
FIG. 2 is a view showing the relationship between a distribution ring and communication ports.

As shown in FIG. 2, the distribution ring 45 is of an annular shape held against the end face of the distribution member 40 with its center offset from the center of the circular pattern of the communication ports 49 toward those cylinder holes in the expansion stroke. In response to rotation of the distribution member 40, the distribution ring 45 supplies oil discharged from the pump into the cylinder holes 9 through those communication ports 49 which open into the inner oil chamber 46a, operating the pump plungers 10 in the expansion stroke, and also discharges working oil from those communication ports 49 opening into the outer oil chamber 46b dependent on the contraction stroke of the pump plungers 10.

Figure 3:
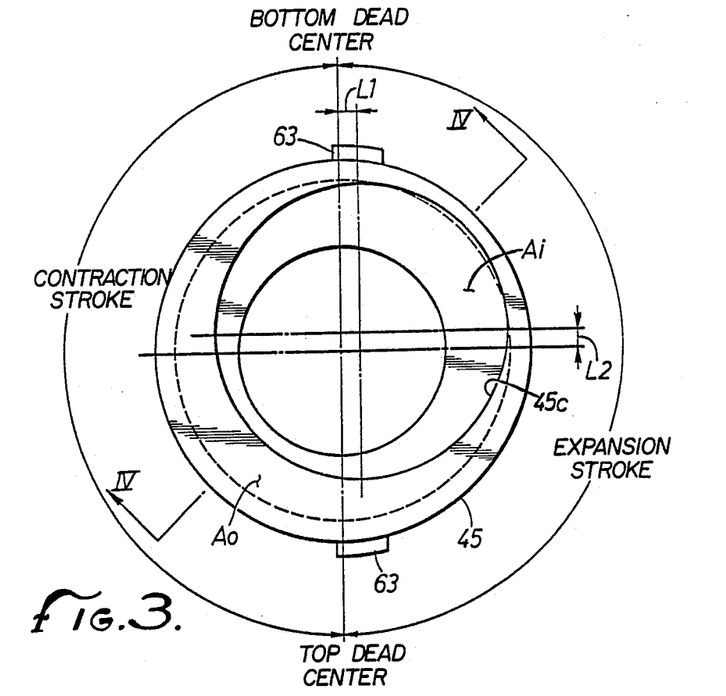
FIG. 3 is an end view of the distribution ring as viewed from a fixed shaft.
Figure 4:
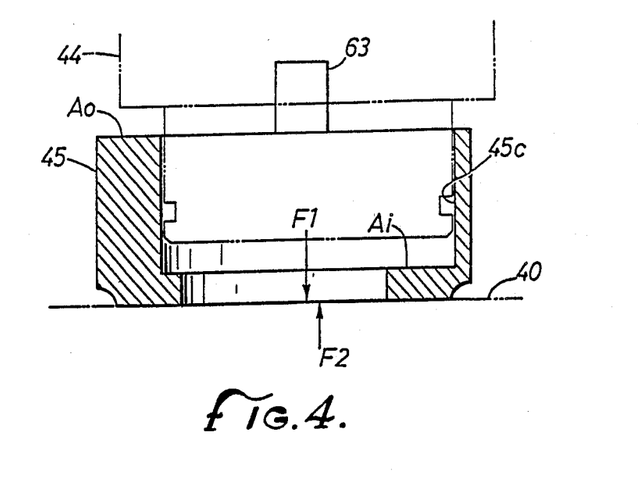
FIG. 4 is a cross-sectional view taken along line IV—IV of FIG. 3.

As illustrated in FIGS. 3 and 4, the distribution ring 45 is substantially cylindrical in form and has a receiving hole 45c in which a free end portion of the fixed shaft 44 is fitted. The receiving hole 45c has its center offset from the center of the distribution ring 45 toward the expansion stroke side by a dimension L1 and toward the bottom dead center by a dimension L2. With this arrangement, most of an axial pressure-bearing surface Ai within the inner oil chamber 46a is displaced toward the expansion stroke side and the bottom dead center, and hence an axial pressure bearing surface Ao facing into the outer oil chamber 46b is displaced toward the contraction stroke side and the top dead center.

Separating forces developed under the inner pressure in the cylinder holes 9 act between the distribution member 40 and the distribution ring 45. As described above, the center of such separating forces tends to be shifted toward the expansion stroke side and the bottom dead center upon acceleration, and to be shifted in the opposite direction upon deceleration when engine braking is applied.

According to the present invention, the axial pressure-bearing surfaces Ai, Ao of the distribution ring 45 are displaced eccentrically off the center of the distribution ring 45, as described above, so that the center of pressing forces F1 due to the inner pressure in the interior space 46 and the center of separating forces F2 due to the inner pressure in the cylinder holes will be aligned with each other as much as possible.

Figure 5:
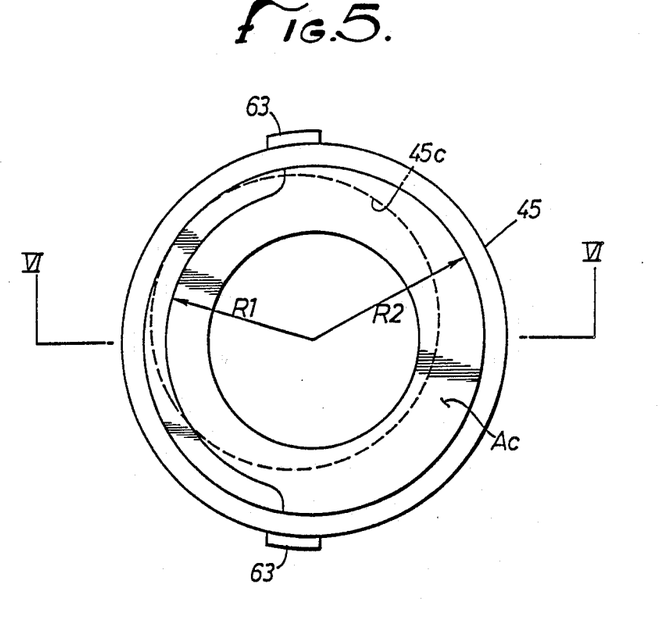
FIG. 5 is an end view of a distribution ring according to a modified embodiment as viewed from a distribution member.
Figure 6:
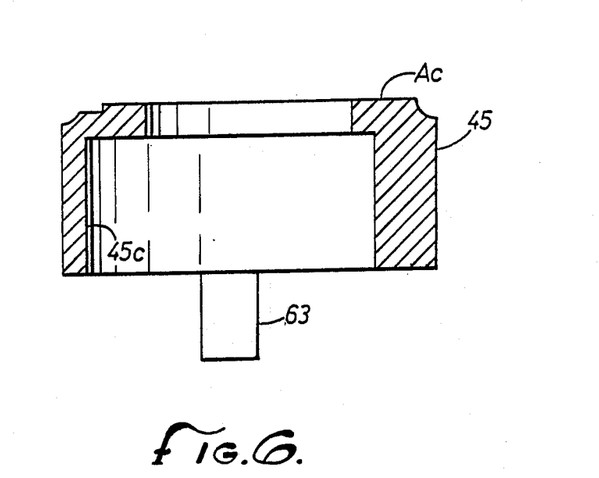
FIG. 6 is a cross-sectional view taken along line VI—VI of FIG. 5.

FIGS. 5 and 6 show a modified embodiment according to the present invention. In this embodiment, the profile of a surface Ac of a distribution ring 45 which abuts against the distribution member 40 is asymmetrical or different between a portion having a radius R1 on the expansion stroke side and a portion having a radius R2 on the contraction stroke side. By thus modifying the profile, the magnitude of the separating forces, the point where the separating forces are applied, and the position of the fulcrum for a tilting moment can appropriately be varied.

Figure 7:
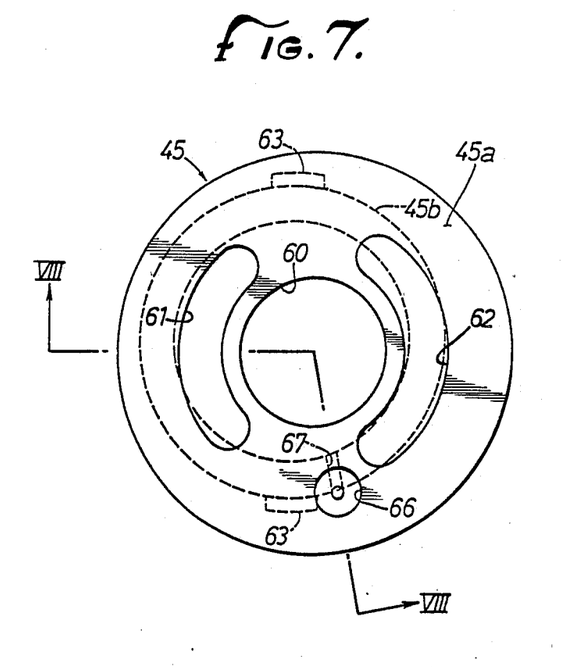
FIG. 7 is an end view similar to FIG. 5, showing still another embodiment.
Figure 8:
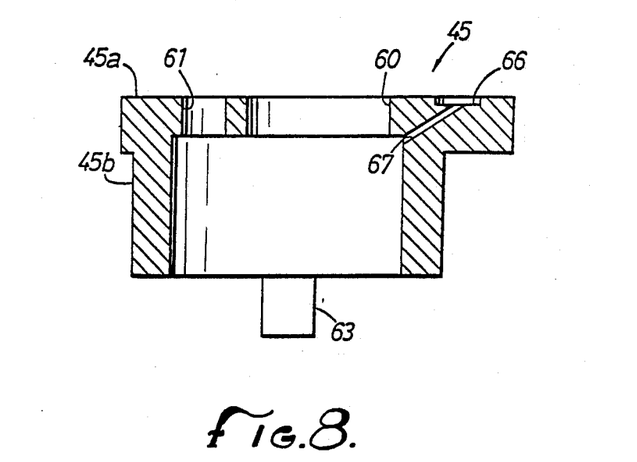
FIG. 8 is a cross-sectional view taken along line VIII—VIII of FIG. 7.

FIGS. 7 and 8 illustrate another modified embodiment. A distribution ring 45 comprises a disc portion 45a held in slidable contact with the end face of the distribution member 40 and a cylindrical portion 45b receiving the free end portion of the fixed shaft 44. The disc portion 45a has defined centrally therein a central hole 60 communicating with the outlet port 47 of the hydraulic motor M and through which the shoe 58 on the distal end of the servomotor S2 extends, a suction port 61 providing communication between the surface of the disc portion 45a which is slidably held against the distribution member 40 and an interior space of the cylindrical portion 45b, and a discharge port 62 providing communication between the same surface of the disc portion 45a and an exterior space around the cylindrical portion 45b.

The suction port 61 communicates the inner oil chamber 46a with the communication ports 49 which correspond to those cylinder holes in the expansion stroke, whereas the discharge port 62 communicates the outer oil chamber 46b with the communication ports 49 which correspond to those cylinder holes in the contraction stroke. As shown in FIG. 7, these ports 61, 62 are arcuate in shape so as to extend substantially along the circular pattern of the communication ports so that each of the ports 61, 62 can communicate wi plural communication ports 49 at the same time.

The distribution r 45 also has a hydraulic pocket 66 defined in its surface abutting against the distribution member 40 in the vicinity of a circumferential end of the discharge port 62 near the top dead center. The hydraulic pocket 66 communicates with the inner oil chamber 46 through a small-diameter hole 67 for introducing the high oil pressure from the pump into the gap between the distribution member 40 and the distribution ring 45 to provide a hydrostatic thrust bearing therebetween. This hydrostatic thrust bearing is effective in locally increasing separating forces into equilibrium with pressing forces.

Figure 9:
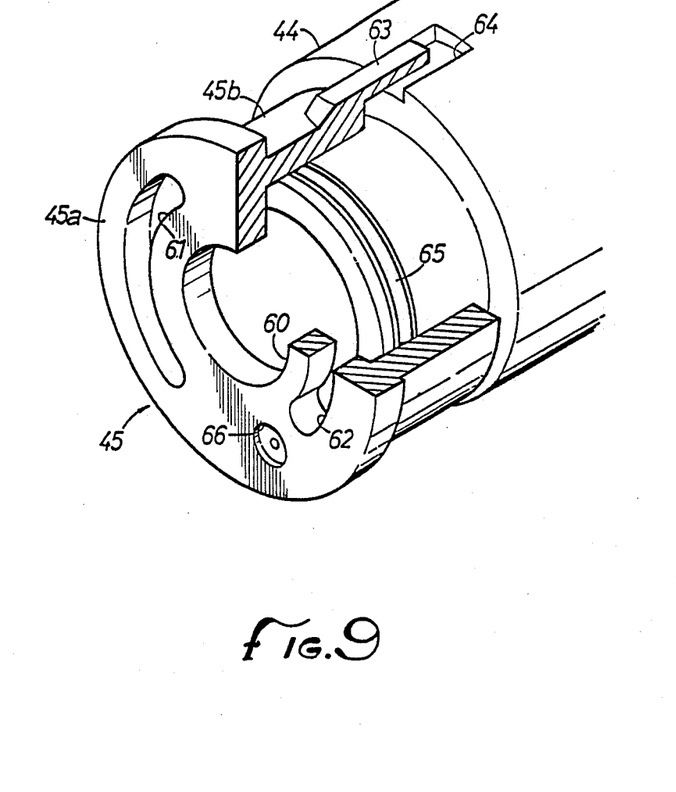
FIG. 9 is a perspective view, partly cut away, of a distribution ring installed on a fixed shaft.

When the distribution ring 45 of each of the above embodiments is varied in its circumferential or angular position, it tends to obstruct the proper operation of the motor plungers. To avoid this problem, it is necessary to limit the angular relationship of the distribution ring 45 with respect to the fixed shaft 44. As shown in FIG. 9, the cylindrical portion of each of the distribution rings 45, such as cylindrical portion 45b of the embodiment of FIGS. 7 and 8, has a pair of axial fingers 63 disposed in substantially diametrically opposite relation on the outer circumferential surface thereof. The fixed shaft 44 has a pair of substantially diametrically opposite recesses 64 defined in the outer circumferential surface thereof. With the fingers 63 engaging in the respective recesses 64, the cylindrical portion 45b is fitted in a fluid-tight manner over the end of the fixed shaft 44 with a seal member 65 such as an O-ring interposed therebetween, thus preventing the distribution ring 45 and the fixed shaft 44 from being relatively turned.

The above embodiments may be used individually in their disclosed forms or features of each may be combined appropriately for attaining a greatly improved balancing effect. The present invention is equally applicable to both the annular distribution ring according to the first embodiment and the distribution ring having separately defined suction and discharge ports according to the third embodiment.

With the present invention, as described above, since the center of a tilting moment applied to the distribution ring by separating forces and the center of a tilting moment applied to the distribution ring by pressing forces can be appropriately adjusted, these moments can be balanced optimally to improve the condition in which the distribution ring and the distribution member are slidably held against each other for thereby reducing oil leakage from the motor cylinder. Consequently, the present invention is highly effective in increasing the power transmitting efficiency of a continuously variable transmission.

We claim:

1. In a distribution ring in a hydraulically operated continuously variable transmission comprising a hydraulic motor of the variable displacement type having a motor cylinder coupled to an output shaft and including motor plungers slidably disposed respectively in a number of cylinder bores defined in an annular pattern surrounding the center of rotation of the motor cylinder, and a hydraulic pump coupled to an input shaft, said hydraulic motor and said hydraulic pump being interconnected by a closed hydraulic circuit, said distribution ring being relatively rotatably and slidably held against an end surface of said motor cylinder for successively switching the introduction of working oil into said cylinder bores and the discharge of working oil from said cylinder bores in response to rotation of said motor cylinder, the improvement comprising, said distribution ring having an asymmetrical hydraulic pressure bearing area for minimizing forces tending to tilt said distribution ring relative to said motor cylinder.

2. A distribution ring according to claim 1, wherein said distribution ring has plural hydraulic pressure-bearing surfaces for producing opposing forces tending to press the distribution ring against and separate the distribution ring away from said end surface of said motor cylinder, said plural pressure bearing surfaces being shaped to align the opposing resultant forces produced by said plural hydraulic pressure bearing surfaces with each other.

3. A distribution ring according to claim 1, wherein the distribution ring has a hydraulic pressure pocket defined in the surface thereof abutting against said motor cylinder end surface for introducing the pressure discharged from said hydraulic pump.

4. A distribution ring according to claim 2, wherein the distribution ring has a hydraulic pressure pocket defined in the surface thereof abutting against said motor cylinder end surface for introducing the pressure discharged from said hydraulic pump.

5. In a distribution ring in a hydraulically operated continuously variable transmission comprising a hydraulic motor of the variable displacement type having a rotatable motor cylinder with a plurality of motor plungers slidably disposed in a like plurality of cylinder holes defined in the motor cylinder, and a hydraulic pump, said hydraulic motor and said hydraulic pump being interconnected by a closed hydraulic circuit, said distribution ring having an annular surface rotatably and slidably held against an end surface of said motor cylinder for successively switching the introduction of working oil into said cylinder bores and the discharge of working oil from said cylinder bores in response to rotation of said motor cylinder, the improvement comprising, said distribution ring having hydraulic pressure bearing areas subjected to different pressures urging the distribution ring in opposite directions relative to said motor cylinder, and said hydraulic pressure bearing areas arranged asymmetrically relative to the axis of rotation of the motor cylinder for substantially equalizing surface pressure forces around the entire annular surface of the distribution ring against the end surface of the motor cylinder.

6. A distribution ring according to claim 5, wherein the distribution ring has a hydraulic pressure pocket defined in the annular surface thereof abutting against said motor cylinder for introducing the pressure discharged from said hydraulic pump.

7. A distribution ring according to claim 5, wherein the distribution ring annular surface is a single continuous surface positioned eccentrically relative to the axis of rotation of the motor cylinder.

8. A distribution ring according to claim 7, wherein the distribution ring annular surface is an irregularly shaped surface.

9. A distribution ring according to claim 5, wherein the distribution ring annular surface includes circumferentially extending parts formed therein for controlling the flow of working oil past the distribution ring.

* * * * *